United States Patent [19]

Piersol

[11] 4,279,696

[45] Jul. 21, 1981

[54] PROCESS FOR FORMING FRICTION MATERIALS

[75] Inventor: Jay L. Piersol, Lancaster, Pa.

[73] Assignee: Armstrong World Industries, Inc., Lancaster, Pa.

[21] Appl. No.: 161,413

[22] Filed: Jun. 20, 1980

[51] Int. Cl.³ .............................................. D21H 5/18
[52] U.S. Cl. ................................... 162/146; 162/165; 162/169; 162/181 R; 162/181 C
[58] Field of Search ................... 162/146, 145, 157 R, 162/165, 169, 181 C, 181 R

[56] References Cited

U.S. PATENT DOCUMENTS

| | | | |
|---|---|---|---|
| 2,962,414 | 11/1960 | Arledter | 162/165 |
| 3,269,976 | 8/1966 | Ueda | 260/38 |
| 3,434,998 | 3/1969 | Aldrich et al. | 260/38 |
| 3,850,791 | 11/1974 | Guittard | 162/145 |
| 3,856,120 | 12/1974 | Kwolek et al. | 188/251 A |
| 3,927,241 | 12/1975 | Augustin | 428/408 |
| 3,956,545 | 5/1976 | Afflerbach et al. | 428/37 |
| 3,959,194 | 5/1976 | Adelmann | 260/17.2 |
| 3,972,394 | 8/1976 | Jacko et al. | 188/73.1 |

Primary Examiner—Peter Chin
Attorney, Agent, or Firm—Daniel De Joseph

[57] ABSTRACT

An improved process for forming a friction material having metal fibers evenly dispersed in the body of the material. The raw materials for production of the friction material are dispersed in an aqueous slurry. The slurry is formed into a sheet. This sheet is subsequently cured and cut to form brake pads and related friction materials.

9 Claims, No Drawings

PROCESS FOR FORMING FRICTION MATERIALS

BACKGROUND OF THE INVENTION

The present invention relates generally to friction materials and, more particularly, to methods of making friction materials having metal fibers dispersed therein.

Friction materials of the type that are used in brake pads and clutch plates ordinarily contain one or more fiber materials, filler materials, and a resin binder. In order to improve their performance, various special components may be added to the friction materials. The addition of metal fibers and/or particles have been found to improve fade and heat resistance while providing good endurance and increased strength. However, when it has been attempted to use papermaking machines to manufacture friction materials having metal fibers incorporated therein, it has been found that the fibers and/or particles tend to settle toward the bottom of the material during the manufacturing process. Yet, it is highly desirable to use papermaking techniques to manufacture friction materials since it is a rapid and efficient method of manufacture which allows hydrated cellulose fibers of increased strength to be used in the formulation in place of asbestos.

Accordingly, it is a principal object of the invention to provide an efficient method of manufacturing improved friction materials.

It is another object of the present invention to provide an improved method of manufacturing friction materials which contain cellulose fibers and metal fibers.

It is a further object of the present invention to provide a method of manufacturing friction materials incorporating cellulose and metal fibers on a papermaking machine whereby the final product has the metal fibers substantially evenly dispersed therethrough.

SUMMARY OF THE INVENTION

A process for forming a friction material containing metal fibers and/or particles substantially evenly dispersed therethrough. An aqueous slurry of cellulose fibers at 1-5 percent solids is beaten in a hydrating refiner to expand and improve the strength of the fibers. These cellulose fibers are then used to form an aqueous slurry at 5-15 percent solids comprising: the cellulose fibers, fine metal fibers, powdered resin, rubber latex, and inorganic fillers. This slurry is formed into a thickened sheet. The sheet is subsequently cured, such as by utilizing heat and pressure. The sheet is then cut to form the pieces of friction materials desired.

DESCRIPTION OF THE PREFERRED EMBODIMENT

In the preferred embodiment of the present invention cellulose fibers, which may be provided in any number of commercial forms including fiber sheets, are first treated in a conventional hydrating refiner, such as a double disc refiner. The cellulose fibers are dispersed in an aqueous suspension at 1-5 percent solids. The suspension is then beaten in the refiner until it attains a Canadian 3 gram freeness of 300-500, pure water having a Canadian 3 gram freeness of 870. The refiner acts by applying sheer forces, while avoiding cutting, to increase the surface area and improve the strength of the cellulose fibers. Preferably, cutting is limited so that, for example, if 35-50 percent of the raw fibers are retained on a 14 mesh Clark classifier screen, no less than 25-35 percent of the refined fibers will be retained on the 14 mesh Clark classifier screen.

An aqueous slurry is formed of all the raw materials for the friction material including the suspension of refined cellulose fibers. The slurry is comprised at 7-15 weight percent solids at a Canadian freeness of 500-600. The consistency of the slurry is carefully selected to provide for efficient water drainage and to provide that all the components of the slurry are maintained substantially evenly distributed through the material during the manufacturing process. Preferably, the slurry should comprise: 5-15 weight percent of the suspension of cellulose fibers, refined as described; 25-70 weight percent fine metal fibers; 12-15 weight percent powdered resin; 5-15 weight percent binder; and 5-25 weight percent inorganic fillers. The cellulose fibers are preferably kraft fibers although other types of cellulose fibers, such as sulfite cellulose, sulfate cellulose, carton, rag, redwood, or the like may be used. The metal fibers may be iron, copper, brass, or zinc and are preferably in the range of 1-5 mils in thickness and 5-20 mils in length. The powdered resin is preferably a heat-curable type having good properties of strength, hardness and resistance to abrasion. Typical resins having acceptable qualities are melaminealdehyde resins and phenolic resins. The binder is preferably an elastomeric compound, although resinous compounds may be used. The most suitable binders are synthetic rubbers such as neoprene latex and nitrile latex. The inorganic filler may exist in the form of particles or fibers. Typical filler materials include diatomaceous earth, metal powders, graphite, alumina, or mineral wool, glass, aluminum silicate, or quartz fibers. Additional inorganic filler materials include aluminum oxide, barium sulfate, calcium carbonate, zinc oxide, and paper filler clay. The strength provided to the final product by the cellulose fibers may also be supplemented by the inclusion of limited amounts of asbestos fibers and/or synthetic organic fibers such as aromatic polyamide fibers.

The slurry for making the friction material is optimumly formed by adding the metal fibers, powdered resin, and inorganic filler to the refined cellulose fibers. Small amounts of alum and ammonium hydroxide, or similar reagents, are then added to the slurry to act as electrolytes and to sensitize the components in preparation for addition of the binder. Last, the binder should be added and the slurry thoroughly mixed. Controlled even deposition of latex particles is necessary to produce homogeneously dispersed ingredients.

In a standard Fourdrinier papermaking machine as may be employed in the present invention, the slurry for making the friction material is supplied to the papermaking machine's head box. The slurry then moves over the machine's apron onto the machine's endless open mesh belt which moves on a set of rollers. The slurry may be agitated, such as by a standard mixing means as it (the slurry) is run out onto the endless open mesh belt. As the belt moves the slurry, water drains down through the belt into catch basins. The slurry is progressively transformed into a thickening sheet. Vacuum boxes may be disposed under the belt to help draw water out of the thickening sheet and/or the sheet may be compressed between upper and lower moving wires or felt-covered press rolls. The slurry is generally run out onto the belt at near to maximum depth, which may be as much as 3-4 inches, in order to provide for a sufficiently thick final product. The overall consistency of the slurry, including the percentage solids, the condition of refinement of the cellulose fibers, and the amount of binder, are selected to provide that all the components of the slurry and especially the metal fibers or metal powder fillers remain evenly distributed throughout the material during the manufacturing process. After the thickening sheet has been formed, it is passed through an oven or drum dryers maintained at conditions of elevated temperature sufficient to drive off any water remaining in the sheet. The resulting sheet may then be cut into sheets and press-cured under heat and pressure, such, as, for example, from about 500 to about 3000 psi and at about 275° F. to about 340° F. Finally, the sheet may be cut for the final product.

EXAMPLE

Fourteen weight parts kraft cellulose fibers beaten in aqueous solution at 3 percent solids in a double disc refiner to a Canadian freeness of 400 were mixed with 56 weight parts fine iron fibers between 2-5 mils in thickness and 5-20 mils in length, 18 weight parts diatomaceous earth of a particle size ranging from 2-8 microns, and 14 weight parts powdered one-step phenol-formaldehyde resin. One weight part alum and ¾ weight part 28 percent ammonium hydroxide were then added to the slurry to bring it to a pH of from about 7 to 8. Fourteen weight parts neoprene latex were then added to the slurry under agitation and the mix was thoroughly blended. The final slurry was adjusted to attain a Canadian freeness of 550-650 and was then run out at an initial depth of 3 inches. The slurry was allowed to thicken on the Fourdrinier wire. The thickened sheet was then passed through an oven at elevated temperatures approaching 300° F. to drive off the remaining water. The sheet was then cut into pieces and press-cured at 325° F. and 2000 psi for 10 minutes. The final product contained the metal fibers substantially evenly dispersed therethrough.

What is claimed is:

1. A process for forming a friction material, comprising the steps of:
    (a) forming an aqueous slurry at 7-15 weight percent solids and a Canadian freeness of about 500 to about 600, said slurry comprising:
        (1) about 5 to about 15 weight percent of an aqueous suspension of refined cellulose fibers, said suspension having 1-5 weight percent solids and a Canadian freeness in the range of from about 300 to about 500;
        (2) from about 25 to about 70 weight percent fine metal fibers;
        (3) from about 12 to about 15 weight percent powdered resin;
        (4) from about 5 to about 15 weight percent rubber latex; and
        (5) from about 5 to about 25 weight percent inorganic fillers;
    (b) forming a thickened sheet from said slurry; and
    (c) curing said sheet to thereby form a friction material containing metal fibers substantially evenly dispersed therethrough.

2. The process of claim 1 wherein, in step (b), the thickened sheet is formed on a Fourdrinier papermaking machine.

3. The process of claim 1, wherein the cellulose fibers are kraft fibers.

4. The process of claim 1, wherein the powdered resin is phenol-formaldehyde resin.

5. The process of claim 1, wherein the rubber latex is neoprene latex.

6. The process of claim 1, wherein the inorganic filler is diatomaceous earth.

7. The process of claim 1, wherein the fine metal fibers are iron fibers.

8. The process of claim 1, wherein the cellulose fibers are kraft fibers, the powdered resin is phenol-formaldehyde resin, the rubber latex is neoprene latex, the inorganic filler is diatomaceous earth and the fine metal fibers are iron fibers.

9. A friction material containing metal fibers substantially evenly dispersed therethrough produced by:
    (a) removing water from an aqueous slurry, said slurry having 7-15 weight percent solids and a Canadian freeness of about 500 to about 600, said slurry comprising:
        (1) about 5 to about 15 weight percent of an aqueous suspension of refined cellulose fibers, said suspension having 1-5 weight percent solids and a Canadian freeness in the range of from about 300 to about 500;
        (2) from about 25 to about 70 weight percent fine metal fibers;
        (3) from about 12 to about 15 weight percent powdered resin;
        (4) from about 5 to about 15 weight percent rubber latex; and
        (5) from about 5 to about 25 weight percent inorganic fillers to thereby form a thickened sheet from said slurry; and
    (b) curing said sheet to thereby from the friction material.

* * * * *